Dec. 18, 1928.  1,696,032
F. B. GLOVER
ENGRAVING CUTTER HEAD AND DEPTH GAUGE
Filed Sept. 26, 1922    2 Sheets-Sheet 1
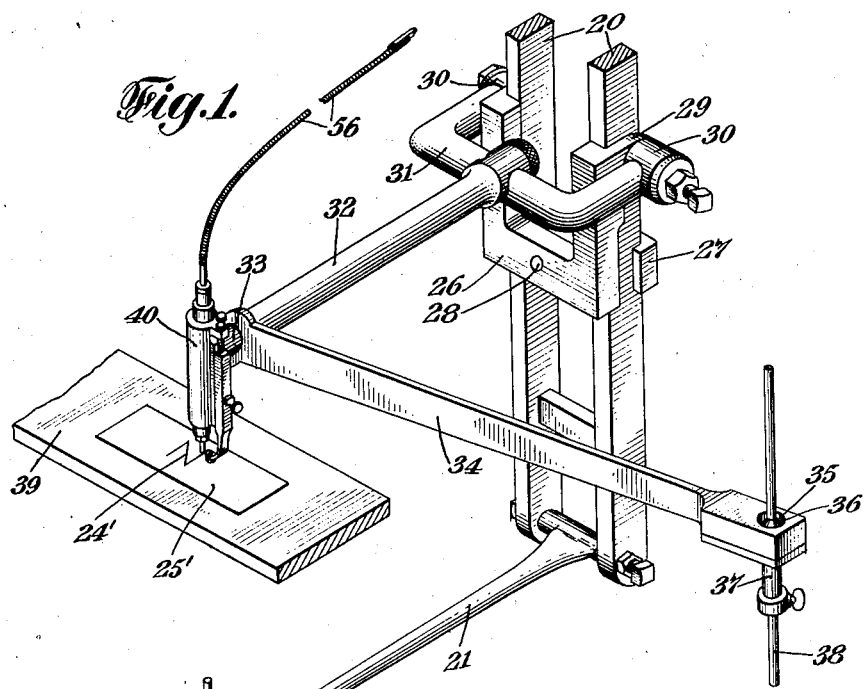
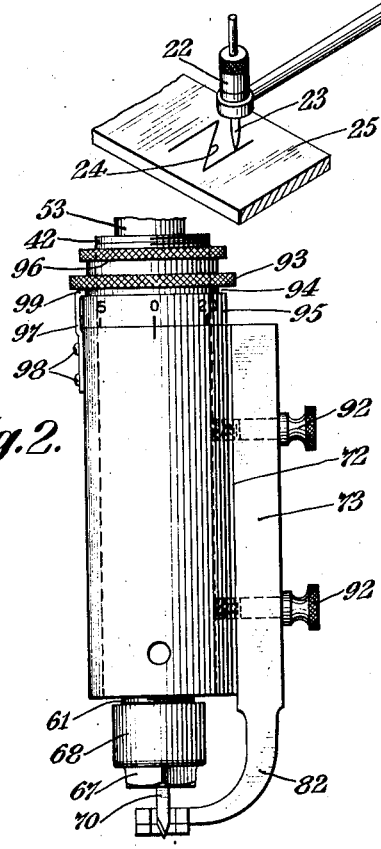
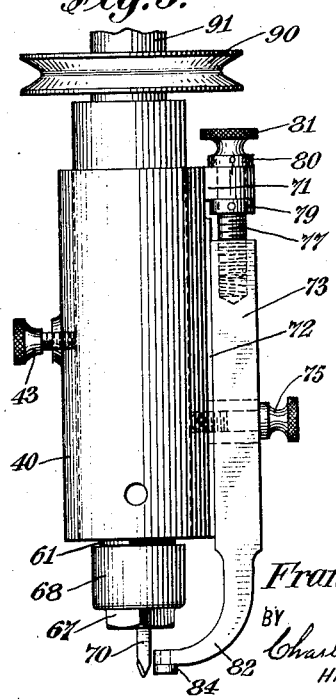
INVENTOR
*Frank B. Glover.*
BY *Charles L. Wright.*
HIS ATTORNEY Dec. 18, 1928.
F. B. GLOVER
1,696,032
ENGRAVING CUTTER HEAD AND DEPTH GAUGE
Filed Sept. 26, 1922
2 Sheets-Sheet 2
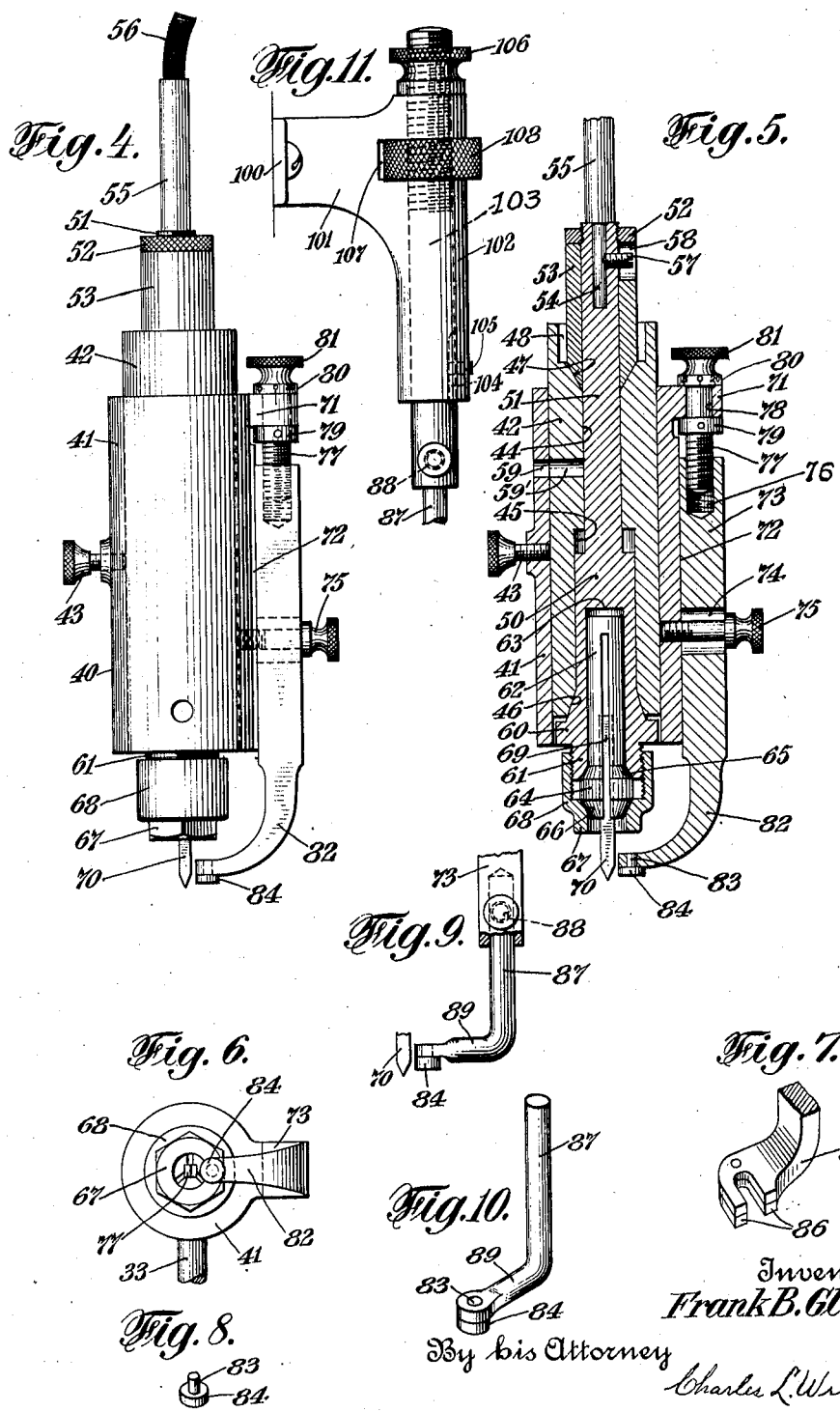
Inventor
Frank B. Glover.
By his Attorney
Charles L. Wright.

Patented Dec. 18, 1928.

1,696,032

UNITED STATES PATENT OFFICE.

FRANK B. GLOVER, OF BROOKLYN, NEW YORK.

ENGRAVING CUTTER HEAD AND DEPTH GAUGE.

Application filed September 26, 1922. Serial No. 590,572.

This invention relates to improvements in engraving or routing machines in which a rotary cutter is used, the same being guided in its work path by a tracer point or stylus directed by a master plate pattern or by hand.

The main purpose of the invention is to produce an improved head having means for driving interchangeable cutters held therein, at a high rate of speed, free from vibration and automatically centered upon being clamped.

Another purpose is to so arrange the structure that it will not be diverted by the driving means employed, so as to be perfectly free to follow a guide in any direction.

A further aim is in the provision of means for adjustably gauging the depth of the cutters from the adjacent surface of the article undergoing the engraving operation, said gauge or depth limiting devices including rigid clamping means formed directly with the head and which are susceptible of use on allied cutter carrying apparatus.

Still another object is to provide an adjustable limit stop or gauge in the form of an attachment, applicable to any standard make of cutter carrying head.

Other aims, objects and purposes will become apparent as the disclosure proceeds and are accomplished by the novel and practical construction, arrangement and combination of parts hereinafter described and shown in the accompanying drawings, forming a consequential part of this disclosure, and in which:—

Figure 1 is a general perspective view showing the main moving parts of a conventional type of engraving machine, illustrating the application of the invention.

Figure 2 is an enlarged front elevational view of one embodiment of cutter head and gauge.

Figure 3 is a similar view showing a modification of the same.

Figure 4 is another like view illustrating a further modified type.

Figure 5 is a central longitudinal sectional view of the type shown in Fig. 4 but generally illustrative of the internal arrangement of the others.

Figure 6 is a bottom plan view of the same.

Figure 7 is a fragmentary perspective view of one type of gauge presser foot as shown in connection with Fig. 2 and of which there may be several shapes.

Figure 8 is a perspective view of the contactor as used in connection with the other gauge bars shown.

Figure 9 is a fragmentary front view showing a modified form of gauge bar having a rotatably adjustable extension and contactor fixed therein.

Figure 10 is a perspective view of the gauge bar extension in detail.

Figure 11 is a side elevational view of a gauge attachment suited to be applied to any of differing styles of heads.

The engraving machine partially shown in Fig. 1 is based on the pantographic principle, the pair of uprights designated by the numeral 20 being supported by a gimbal or universal joint at their upper ends and are free to move in any direction in a substantially horizontal plane.

Pivoted between their lower ends is a forwardly extending arm 21 having at its free end a head 22 in which is clamped a tracer point 23 capable of being guided in the depressed lines of the character 24 formed in the master plate 25, the latter being suitably secured to the frame of the machine.

A slide 26 engages the front and outer sides of the pivoted upright lever bars 20, the same being held in any desired adjustment by the clamp 27 connected by the screw 28.

At the upper part of the slide are projections 29 on which are mounted the hubs 30 of a yoke 31 supporting a central, forwardly extending bar 32, the front end of which is receptive of a stud 33 fixed rigidly in the cutter head 40.

Also fixed to the stud, which is rotatable in the bar 32, is an arm 34 extending laterally and provided in its enlarged outer end with a socket 35 adapted to receive the ball 36 carried on the end of a sleeve 37 adjustable on a support rod 38 fixed to the base of the machine.

A work support or table 39 carried by the machine frame, provides a rest for the part to be engraved, as the plate 25' on which is shown the character 24' the same being a duplicate of the master character 24 on the guide plate 25, but reduced in size in accordance with the relative position of the slide 26 to the pivoted axis of the arm 21.

Obviously raising the slide reduces the action of the arm 32 and head carried by it so that any desired proportion can be obtained, while adjusting the arm 34 causes the head to tilt at an angle to attain certain results not necessary to describe.

The head 40, shown best in Figs. 4, 5 and 6 consists of a generally cylindrical casing 41, to which the stud 33 is rigidly connected, and is smooth bored to receive a sleeve 42 which may be clamped by the set-screw 43 engaged in a boss formed with the casing.

Said sleeve is axially bored as at 44, its lower end being counterbored, as at 45. A conical seat 46 extends convergingly in from the lower end of the sleeve to the counterbore 45 and a similar converging conical seat 47 extends from the annular recess 48 in the projecting upper end of the sleeve to the bore 44.

A spindle 50 has its main portion fitted to the counterbore 45, its reduced diametrical portion 51 fitting the bore 44, and extends outward beyond the sleeve, its end being screw-threaded to receive one or more binding nuts 52.

Said nuts impinge upon the top of an inner sleeve 53 having a conical lower end suited to the corresponding seat 47 and is bored to fit the upper element 51 of the spindle.

In the upper end of the spindle an axial hole is drilled to receive the stem 54 of a sleeve 55 in which is engaged a flexible shaft 56 connecting with any convenient source of rotary motion to convey the same to the spindle.

Said stem 54 is shown as held by a set-screw 57 in the spindle, the screw being accessible through the recess 58 in the upper part of the sleeve 53.

Lubrication is provided for by the recess 48, and also by drilled holes 59 and 59' respectively in the casing 41 and sleeve 42, oil from which enters between the spindle and sleeve when these holes are in register and may also collect in the space at the upper end of the counterbore 45.

The spindle 50 is enlarged into a cone fitting the seat 46, flanged outwardly into an annulus 60 nearly filling the bore of the casing below the sleeve 42, and then formed into a screw-threaded plug end 61.

A spring chuck 62 is adapted to engage the bore 63 of the spindle 50, the chuck being partially split and formed with an oppositely coned head 64, the inner cone fitting a seat 65 in the end of the spindle and the outer cone fitting a similar but reversed seat 66 formed in the hexagonal, wrench receiving portion 67 of a cap 68 fitting the screw plug end 61 of the spindle.

The axial bore of these chucks may differ to suit the stems or shanks 69 of the routing cutters 70 which also vary in size and shape according to the work to be performed by them.

The foregoing is descriptive of the cutter head, which, as will be seen, is comprised of accurately fitted parts, preferably hardened and ground, well lubricated and in which provision is made for taking up wear and maintaining axial alinement at all times, vibration proof and easy running, particularly when driven by the flexible shaft as shown.

The depth limiting or gauging device, forming part of the head, is attached by means of a lug 71 extending from the side of the casing 41 at its upper end, there being a flat longitudinal seat 72 extending from the lug to the bottom of the casing.

A bar 73, of rectangular cross section, is suited to slide on the seat 72, the bar having a slot 74 through which passes a knurled headed clamp screw 75, threaded into the casing as shown.

The upper end of the bar is drilled and tapped as at 76, to receive a screw 77 extending down through the opening 78 in the lug 71, the shank of the screw having fixed to it a collar 79 abutting the lower side of the lug, opposite the graduated shoulder 80 of the screw head 81.

Therefore when the screw 75 is loosened the bar 73 can be accurately adjusted longitudinally of the head and thereafter rigidly clamped to it.

Formed with the lower end of the bar 73 is a reduced angularly bent elbow 82 extending adjacent the end of the cutter 70 and having an opening to receive the stem 83 of a contactor 84 shown in detail in Fig. 8.

Another form of contactor is shown in Fig. 7, in which the reduced portion 82 of the bar is forked to extend on each side of the cutter, in the manner of a presser foot and provided with a renewable wear element 86 attached in any secure manner, said contactors being preferably made of fibre or soft metal unlikely to abrade the surface engaged.

It will be apparent that the contactor may take the form indicated in Figs. 9 and 10, the bar may be bored at its lower end to receive bits 87 held by a set screw 88, so that the same may be rotated axially and also interchangeable with other bits of varying lengths of angular portions 89.

The adaptation of head shown in Fig. 3 is in all respects similar except that a grooved pulley 90 is fitted on the spindle extension 91 to drive the same in place of the flexible shaft previously described, the depth gauge device remaining unchanged.

Figure 2 illustrates a modification in head and gauge construction, the adjusting screw carrying lug being omitted and the bar 73 held fixedly to the casing seat 72 by binding clamp screws 92, two of which are used.

Relative adjustment of the spindle to the contactor or presser foot is obtained by screw-threading the upper end of the sleeve and providing on it a knurled adjusting ring 93 having an annular groove 94 therebelow, the lower surface of the ring bearing graduations relating to the distance moved and its edge resting on the upper end of the casing as shown.

A clamp or locking nut 96 is provided for maintaining the adjusting ring in position and in order to maintain the ring in engagement with the casing at all times a clip 97 may be fixed to the casing by screws 98 and provided with an inturned hook 99 to engage the groove 94. Thus it will be seen that by omitting the clip 97 the spindle carrying sleeve 42 is floatingly held in the head and free to move therein.

From the foregoing it will be seen that the spindle is readily adjustable within the casing and by means which can be accurately and easily operated.

The gauge attachment as shown in Figure 11, is readily applicable to existing heads by means of screws passing through the foot flanges 100 of a bracket 101, the same being formed with a barrel 102 bored to receive a round bar 103 screw threaded at its upper end and having a key way 104 to receive the point of a screw 105 set in the barrel and by which the bar is prevented from rotating.

The upper end of the bar 103 has fitted to it a lock nut 106 and in a recess 107, formed in the barrel and bracket, is a round adjusting nut 108 by which the bar may be moved lengthwise in the barrel.

The lower end of the bar is bored to receive one of the bits 87 which is securely held when in adjustment by any preferred means, as those previously described.

Due to the ready availability of this attachment, machines now in use can be provided with an efficient depth gauging means at a moderate expense.

It will be understood that the operation of the machine may be so modified that work part 25' and support table 39 may be moved by suitable connections with the arm 32, and the cutter head held stationary, such construction being well within the spirit and scope of the invention.

It is further held that the head 40 may be reversed so that the tool or cutter projects upwardly in place of downwardly, the operative results being the same.

While certain preferred embodiments of this device have been shown and described, it will be understood that changes in the form, arrangements, proportions, sizes and details thereof may be made without departing from the scope of the invention as defined in the appended claims.

Having thus described my invention, what I claim as new and desire to secure by Letters Patent, is:—

1. In an engraving machine, a work support, a cutter head, a cutter carried by said head, means to guide the cutter over the work on the work support, a depth gauge carried by said cutter holder and adapted to bear on the work, means to adjust the head and depth gauge vertically independently, and means to lock the tool holder or gauge in adjusted positions.

2. A pantograph engraving device comprising in combination, a tool guiding and supporting arm, a bearing slidably mounted in said arm for up and down movement, an engraving tool revolvably mounted in said bearing and movable vertically therewith, a tracing arm having a tracing point remote from said engraving tool, a non-marking stop for limiting the depth of cut of said engraving tool.

3. A pantograph engraving device comprising in combination, a tool guiding arm, a bearing slidably mounted in said arm for a floating up and down movement, an engraving tool revolvably mounted in said bearing and movable vertically therewith, a tracing arm having a tracing point, and an adjustable stop adapted to ride upon the work to be engraved for regulating the depth of cut of said engraving tool.

4. A pantograph engraving device comprising, in combination, a tracing arm having a tracing point, a tool guiding arm, a rotating tool carried in said guiding arm arranged for a floating vertical movement, and a work follower separate from said tool and arranged to ride in contact with the work to be engraved for controlling the vertical floating movement of said tool.

5. A pantograph engraving device comprising, in combination, a tracing arm having a tracing point, a tool guiding arm, a rotating tool carried in said guiding arm remote from said tracing point and arranged for a floating vertical movement, a work follower separate from said tool and arranged to ride in contact with the work to be engraved for controlling the vertical movement of said tool, and means for elevating said tool from said work.

6. A pantograph engraving device comprising in combination, a tracing arm having a tracing point, a tool guiding arm, a rotating tool carried in said guiding arm arranged for a floating vertical movement, a work follower separate from said tool, and arranged to ride in contact with the work to be engraved for controlling the vertical floating movement of said tool, and means for adjusting said work follower with respect to said tool to regulate the depth of cut of said tool.

7. A pantograph engraving device comprising, in combination, a tracing arm having a tracing point, a tool guiding arm, a rotating tool carried in said guiding arm arranged for a floating vertical movement, and a work follower separate from and closely adjacent to said tool and arranged to ride in contact with the work to be engraved for controlling the vertical floating movement of said tool.

In testimony whereof I have signed my name to this application.

FRANK B. GLOVER.